Dec. 3, 1968  J. H. A. LASSING  3,414,144
APPARATUS FOR HANDLING BULK CARGO
Filed Jan. 11, 1966  2 Sheets-Sheet 1
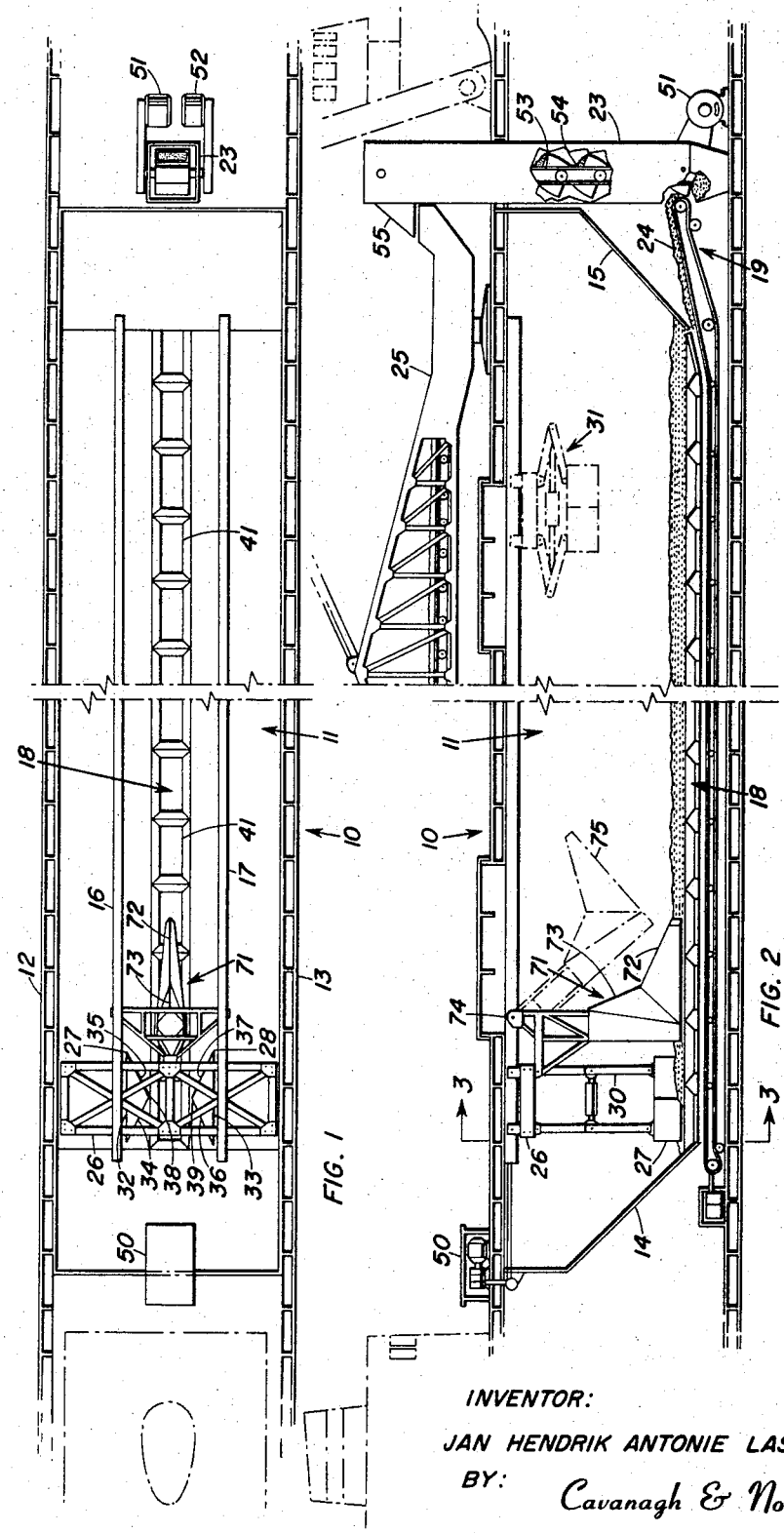
INVENTOR:
JAN HENDRIK ANTONIE LASSING
BY: *Cavanagh & Norman*

INVENTOR:
JAN HENDRIK ANTONIE LASSING

BY: *Cavanagh & Norman*

United States Patent Office 3,414,144
Patented Dec. 3, 1968

3,414,144
APPARATUS FOR HANDLING BULK CARGO
Jan Hendrik Antonie Lassing, Lot 5, Concession 2, Northumberland County, Murray Township, R.R. 3, Trenton, Ontario, Canada
Filed Jan. 11, 1966, Ser. No. 520,003
6 Claims. (Cl. 214—15)

ABSTRACT OF THE DISCLOSURE

This specification deals with apparatus for moving bulk cargo such as, for instance, coal and the like, within the hold of a ship to a central conveyor system whereby the bulk cargo can be lifted through the cargo hatch to dockside. Specifically the disclosure deals with a system of plows which by regular reciprocal movement within the hold moves the bulk cargo into position. An essential feature is the use of a plow to move the bulk cargo from a flat surface over to the conveyor thereby eliminating the usual gravity feed systems presently employed.

---

The invention relates to apparatus for handling bulk cargo in ships' holds and other storage and transport containers.

Containers for storage and transport such as cargo vessels, which are used for bulk materials such as ore and the like are usually designed and built so as to incorporate bulk handling means for unloading cargo. Particularly in the case of a cargo vessel the bulk material must be raised upwardly over the side of the vessel before it is deposited on the dock. In the past, this has usually been achieved by building a number of frusto-conical hoppers, usually in two rows side by side along the length of the ship, with the lower ends thereof provided with trap doors opening onto continuous conveyor belts. Such conveyor belts have usually carried the material from the hoppers to a bucket elevator at one end of the ship. It will be apparent that the use of such a frusto-conical hopper design incorporates a substantial area of dead space which can never be used for storage of the cargo. Obviously, if any attempt is made to use such dead space for the cargo, then it will have to be unloaded by hand since in the majority of cases the cargo will cease to flow freely downwardly after its surface has reached an angle of repose in the region of thirty-five to forty degrees, the precise angle depending upon the type of material. In addition, the existence of a substantial volume of dead space located usually below the water line of the ship inevitably affects the stability of the vessel. Obviously, this problem can be overcome by simply employing laborers to move the cargo after it has ceased to flow freely downwardly but in general, the cost of such hand labor has now risen to the point where it is totally uneconomical and it is generally accepted that it is cheaper to accept the loss in cargo space.

It is therefore an objective of the present invention to permit the use of an open rectangular hold in a ship for carrying bulk cargos and to enable the emptying of such cargo by a simple mechanical means without the use of hand labor.

More particularly, it is an objective of the present invention to provide a mechanical means for unloading a rectangular shaped hold.

More particularly, it is an objective of the present invention to provide a mechanical means for unloading a rectangular shaped hold which is selectively operable on parts of the cargo in the hold so as to procure gradual feeding thereof.

More particularly, it is an objective of the present invention to provide an apparatus having the foregoing advantages which is adaptable for installation in existing ships and also for building into new vessels.

A preferred embodiment of the invention will now be described with reference to the following drawings in which like reference devices refer to like parts thereof throughout the various views and diagrams, and in which:

FIGURE 1 is a plan view of a portion of a transport vessel showing the installation of apparatus according to the present invention;

FIGURE 2 is a side elevation of the vessel as shown in FIGURE 1 having the side removed to illustrate the installation of the cargo handling apparatus;

Figure 3:
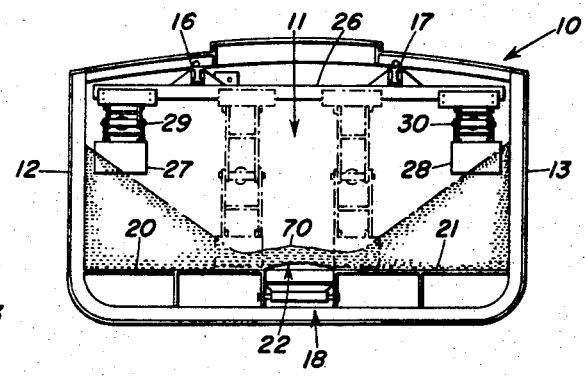
FIGURE 3 is a section along the line 3—3 of FIGURE 2.

Referring to FIGURE 1, FIGURE 2, and FIGURE 3, apparatus according to the present invention is illustrated wherein the apparatus for handling is indicated generally as 10. The hold of a cargo vessel as at 11 is shown having a substantially rectangular configuration to be bounded by the vessel sides 12 and 13 and the end of the vessel hold as 14 and 15.

The apparatus 10 comprises the rail means which in this case are a pair of rails 16 and 17 which extend approximately the length of the hold 11 and are located along the roof of the hold above the storage area for bulk cargo. While two rails 16 and 17 are shown extending down two sides of the hold, it will be understood that four rails may be supplied should this be necessary to support the weight of the apparatus, and that the two rails shown are done so by way of example only.

A belt conveyor as at 18 is situated about centrally of the hold 11 to extend approximately the length thereof and to extend therebeyond as at 19. The conveyor, which in this case is a belt conveyor, is located below the bottom plates 20 and 21 of the hold 11 whereby bulk cargo within the hold tends to pass through the opening as at 22 onto the conveyor 18.

Lifting means 23 is provided at the end 15 of hold 11 and is adapted to pick up the bulk cargo 24 from the conveyor 18 and lift same out of the hold 11 onto the conventional dock transfer handling equipment 25. The particular type of dock equipment 25 utilized is not pertinent to the present invention, and for this reason, details are not given here.

A plow bridge assembly 26 is movably supported on the rails 16 and 17 to extend approximately the width of the hold and is movable along the rails from one end of hold 11 to the other. The bridge 26 is supported near the top of the hold 11 thus to be above the cargo stored therein.

A pair of plows 27 and 28 are supported below the bridge 26 adjacent the floor plates 20 and 21 and are located to either side of the conveyor 18. In this embodiment the plow 27 and 28 are mounted on the retractable mounting frames 29 and 30 which as is shown in FIGURE 3 can be in the retracted position or in the fully extended position as shown in phantom in FIGURE 3. The retracted position in elevation is shown in phantom in FIGURE 2 at 31.

Each of the plows 27 and 28 is provided with an outboard face as at 32 or 33 which is substantially parallel to the direction of travel of the bridge 26 and each plow 27 and 28 is provided with a pair of oblique faces as at 34, 35 and 36, 37 respectively, the pairs of oblique faces intersecting at the points 38 and 39 respectively.

Figure 4:
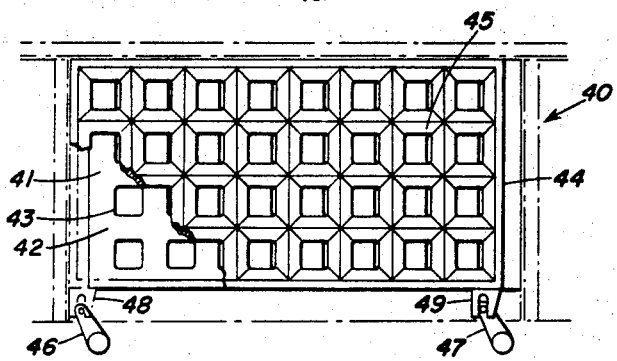
FIGURE 4 is an enlarged plan view of gate means for use with apparatus according to the present invention.

With particular reference to FIGURE 4 gate means as indicated generally at 40 are shown, a similar gate means being used at each of the positions as at 41 along the length of the conveyor 18 as illustrated. Each gate means 40 comprises a lower fixed plate 42 defining a plurality of holes 43 therein and overlayed by a movable gate plate 44 having a plurality of holes 45 therein, these holes matching in pattern the holes 43 in the plate 41. Crank means 46 and 47 are provided operative within the lugs 48 and 49 whereby the plate 44 can be moved to bring the hole pattern 45 in registration with the hole pattern 43, thereby to allow the flow of bulk cargo therethrough.

It is intended that the gate means 40 as illustrated in the drawings be used in plurality along the length of the conveyor 18 whereby selective portions of the hold 11 can be emptied, thereby to prevent overloading and possible clogging of the conveyor system 18. It will be understood of course that the actual design and provision of gate means may vary somewhat depending upon the size of the hold and the particular conveyor system used and that the gate means as shown in the drawings is done so by way of example only.

It should be further understood that while the features of the invention have herein been described and illustrated other parts and equipment will be required in order to perform the necessary operations of material unloading. Thus the motor means 50 as shown in FIGURE 1 and FIGURE 2 is required for the movement of the plow bridge 26 along the tracks 16 and 17, this being accomplished by means of a cable drive, this being well known in the art of material handling. Similarly, motor means in the form of the drive motors 51 and 52 will be required to operate the lifting means 23. It is intended that the lifting means 23 be a type of vertical conveyor system having the buckets 53 thereon which are secured to the travelling endless belt 54 whereby the bulk material 24 can be supplied through the upper chute 55 onto the dock handling device 25. It should be noted however that various alternative designs for the lifting device 23 can be resorted to and that the particular and the arrangement of the parts is done so by way of example.

Figure 5:
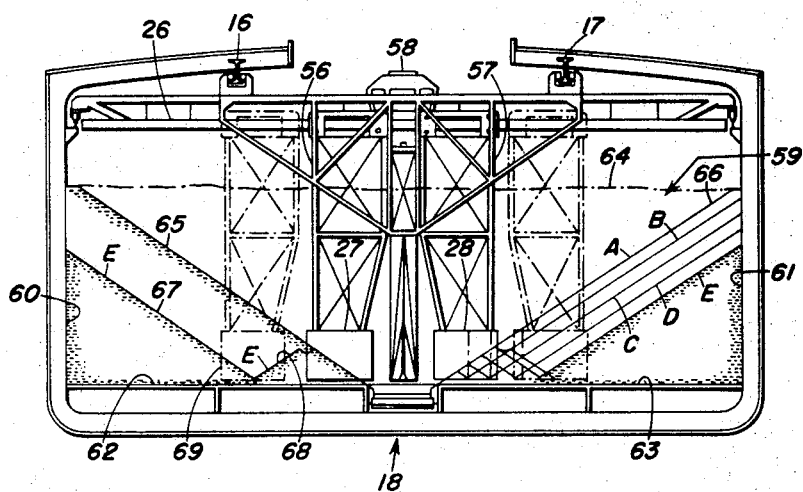
FIGURE 5 is an enlarged sectional view showing portions of the apparatus in elevation and illustrating the means by which the cargo is handled within the vessel hold.

With particular reference to FIGURE 5 an enlarged section through a typical installation of apparatus according to the present invention is shown wherein the plows 27 and 28 are illustrated mounted on the rigid frames 56 and 57 respectively. In this embodiment the frames 56 and 57 are movably secured to the plow bridge 56 for movement therealong. The movement of the particular plows 27 or 28 is towards or away from the conveyor as at 18 and the plows move in unison, that is both move outwardly or inwardly together depending upon the selection of the operator. Also in this embodiment an operator's cab 58 is provided and secured to the plow bridge 26, this being advisable for use with exceptionally large vessels. As before, the movement of the plow bridge 26 along the rails 16 and 17 is done by way of a cable drive (not shown) and it is intended that the individual plow structures 56 and 57 are moved along the bridge 26 in a similar manner.

FIGURE 5 also illustrates the method of clearing the hold 59 as defined by the side walls 60 and 61 and the bottom 62 and 63 of loose cargo. During the initial unloading the bulk cargo 64 as represented by a phantom line pours by gravity feed into the conveyor 18 from whence it is transported to the lift conveyor 23 and thence from the vessel onto the dock handling equipment. At a certain point in the unloading, characterized by the particular type of bulk cargo, the remainder of cargo as indicated by the line 65 and 66, assumes the configuration as shown. In order to transfer this portion of the cargo to the conveyor 18 the plows 27 and 28 are driven from one end of the vessel hold to the other and back again a number of times, the lateral position of the plows being varied in order to move all of the cargo into the area of the conveyor 18.

The right hand portion of the diagram as shown in FIGURE 5 shows the decrease in the pile of cargo within the hold as the plow makes several passes, these passes being identified with the letters A to E inclusive. On the left hand side of the diagram the position of the cargo pile as indicated by the lines 67 and 68 is shown and the position of the plow 27 is shown in phantom as at 69.

At this point in the unloading operation the plows are caused to move inwardly as they are moved the length of the ship whereby the pile as indicated at 68 is transferred into the conveyor 18. Depending upon the size of the hold and the characteristic of the cargo being handled, the above procedure is continued until the cargo has all been transferred to the centre of the hold for handling by the conveyor 18. It is appreciated that a certain portion of the cargo will remain at the ends of the hold after completing all of the plowing runs and for this reason it is preferable to provide the ends as at 14 and 15 as shown in FIGURE 2 sloping downwardly, thereby to reduce the handling at the ends of the plowing runs. In order to move this remaining portion of the cargo into the central area, the plows can be run inwardly to scrape this remaining portion into the conveyor.

During the unloading of certain types of materials a bridging or an arch forming is observed over the conveyor 18 as shown at 70 in FIGURE 3. In order to break this arch form up an arch breaker 71 having a sloping forward portion 72 and an upright portion 73 is mounted on the front of the plow bridge 26 and is adapted to move therewith. While the arch breaker 71 is not in use it can be swung up about the pivot 74 to the stored position as shown in phantom at 75, in which position it clears the bottom of the hold and lies approximately parallel to the sloping ends 15 of the vessel hold. It should be understood that arch breaker 71 can also be mounted on the other side of the plow bridge 26 and that it is shown on one side by way of example.

From the foregoing it will be seen that the present invention provides apparatus for handling bulk cargo in a transport hold such as for instance in the hold of a ship, the apparatus permitting the approximate full use of the hold space and providing for transfer of substantially all of the cargo therefrom. The apparatus can be installed within the hold of a conventional ship to be carried therewith and thus be available for unloading the cargo at a select port.

It will be further understood that although specific embodiments of the invention have herein been described and illustrated, the invention also contemplates other variations.

What I claim is:

1. Apparatus for handling bulk cargo in a transport hold and comprising: rail means extending approximately the length of the hold; a bulk conveyor situated centrally of and extending approximately the length of the hold, said conveyor being located at the bottom of the hold and in communication therewith thus to convey the bulk cargo in a direction toward one end of the hold; a plow bridge movably supported on said rail means to extend approximately the width of the hold and movable from one end of the hold to the other, said bridge being located near the top of said hold to be above the cargo; a pair of plows adjustably positioned on said plow bridge and supported therebelow to be adjacent the hold bottom, said plows being located to either side of said conveyor and movable in unison toward and away therefrom, whereby upon said plow bridge moving along said rail means, said plows will push the bulk cargo toward said conveyor thereafter to be carried toward said one end of the hold; and lifting means for transferring the bulk cargo from said one end out of the hold.

2. Apparatus as claimed in claim 1, including an arch breaker secured to said plow bridge and located just above said conveyor, whereby upon said bridge moving, said breaker will break up any tendency for the cargo to arch over said conveyor and impede flow.

3. Apparatus as claimed in claim 1, wherein each said plow has an outboard face substantially parallel to the direction of travel of said bridge and an inboard face oblique thereto.

4. Apparatus as claimed in claim 3, in which each said plow is provided with a pair of oblique intersecting inboard faces.

5. Apparatus as claimed in claim 1, wherein said plows are vertically adjustable relative to the bottom of the hold.

6. Apparatus as claimed in claim 1, including gate means in the bottom of the hold above said conveyor, whereby the flow of cargo thereon can be selectively controlled.

References Cited

UNITED STATES PATENTS

| | | | |
|---|---|---|---|
| 2,532,249 | 11/1950 | Ward | 214—15 |
| 3,077,995 | 2/1963 | Booth et al. | 214—17 |
| 3,179,264 | 4/1965 | Tallquist | 214—17 |

FOREIGN PATENTS

| | | |
|---|---|---|
| 703,557 | 3/1941 | Germany. |
| 608,791 | 9/1948 | Great Britain. |

ROBERT G. SHERIDAN, *Primary Examiner.*